(12) United States Patent
Ghassaei et al.

(10) Patent No.: US 11,402,963 B2
(45) Date of Patent: Aug. 2, 2022

(54) NEIGHBORING PANEL VIEW

(71) Applicant: Adobe Inc., San Jose, CA (US)

(72) Inventors: Amanda Paige Ghassaei, Mountain View, CA (US); Michal Lukáč, San Jose, CA (US); Wilmot Wei-Mau Li, Seattle, WA (US); Vidya Narayanan, Pittsburgh, PA (US); Eric Joel Stollnitz, Kirkland, WA (US); Daniel Max Kaufman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/249,427

(22) Filed: Jan. 16, 2019

(65) Prior Publication Data

US 2020/0117337 A1    Apr. 16, 2020

Related U.S. Application Data

(60) Provisional application No. 62/745,641, filed on Oct. 15, 2018.

(51) Int. Cl.
*G06F 3/04815* (2022.01)
*G06F 3/04845* (2022.01)
(Continued)

(52) U.S. Cl.
CPC ........ *G06F 3/04815* (2013.01); *G06F 3/0485* (2013.01); *G06F 3/04845* (2013.01);
(Continued)

(58) Field of Classification Search
CPC ................. G06F 3/04815; G06F 30/00; G06F 2203/04803; G09F 2003/0201;
(Continued)

(56) References Cited

U.S. PATENT DOCUMENTS 6,003,664 A * 12/1999 Dolan .................... B65D 5/524
   206/45.29
6,100,893 A *  8/2000 Ensz ....................... G06T 17/20
   345/420

(Continued)

FOREIGN PATENT DOCUMENTS

| CN | 108229075 | 6/2018 |
|---|---|---|
| EP | 2120168 | 11/2009 |
| WO | WO-2007028486 | 3/2007 |

OTHER PUBLICATIONS

"Pre-Interview First Office Action", U.S. Appl. No. 16/296,047, filed Jul. 10, 2020, 7 pages.

(Continued)

*Primary Examiner* — Adam M Queler
*Assistant Examiner* — Maria S Ayad
(74) *Attorney, Agent, or Firm* — FIG. 1 Patents

(57) ABSTRACT

A neighboring panel view is leveraged in a digital medium environment. Initially, a view generation system receives a selection of panels of a three-dimensional (3D) assembled representation of an object, such as to apply digital graphics to the 3D assembled representation. The view generation system also receives a selection of an option to display a neighboring panel view, which is a two-dimensional (2D) flattened view local to the selection. In particular, the neighboring panel view displays an arrangement of the selected panels of the object and their neighboring panels. The view generation system arranges the selected panels in this arrangement as those panels are arranged in the 3D assembled representation. The view generation system also arranges the neighboring panels in the neighboring panel view adjacent to the selected panels with which they are adjacent on the object.

20 Claims, 8 Drawing Sheets

(51) Int. Cl.
*G06F 3/0485* (2022.01)
*G06F 3/04847* (2022.01)
*G06F 3/0482* (2013.01)
*G06F 30/00* (2020.01)
*G06T 11/60* (2006.01)

(52) U.S. Cl.
CPC .......... *G06F 3/04847* (2013.01); *G06F 30/00* (2020.01); *G06T 11/60* (2013.01); *G06F 3/0482* (2013.01); *G06F 2203/04803* (2013.01)

(58) Field of Classification Search
CPC ... G09F 23/00; G09F 3/02; G09F 1/04; G09F 1/06; G06N 5/046; B31B 1/62; B44C 1/00; B44C 1/162; B44C 3/048; B44C 1/24; B42D 15/042; B42D 15/045; B42D 1/006; B42D 5/00; B65D 1/02; B65D 23/14; B65D 81/3205; B65D 5/4266; B65D 5/5028; B65D 5/5035; B65D 5/6664; G06Q 30/0621; G06Q 30/0641; G06T 17/00; G06T 19/00; G06T 15/20; G06T 19/20; G06T 2200/24; G06T 11/00; G06T 5/50; G06T 7/194; A61B 2034/107; A61B 6/466; B65G 57/09; E03D 11/12; E03D 13/00

See application file for complete search history.

(56) References Cited

U.S. PATENT DOCUMENTS

| | | | | |
|---|---|---|---|---|
| 8,994,734 B2* | 3/2015 | Morgana | ............ | B65D 5/0254 345/441 |
| 9,007,388 B1* | 4/2015 | Cook | ............ | G06T 11/203 345/581 |
| 9,654,666 B1* | 5/2017 | Snowball | ............ | H04N 1/04 |
| 9,760,659 B2* | 9/2017 | Eschbach | ............ | G06F 30/00 |
| 2003/0071810 A1 | 4/2003 | Shoov et al. | | |
| 2005/0128211 A1* | 6/2005 | Berger | ............ | G09G 5/00 345/582 |
| 2005/0157342 A1* | 7/2005 | Bru | ............ | G06K 15/02 358/1.18 |
| 2007/0055401 A1* | 3/2007 | Van Bael | ............ | G06F 19/00 700/98 |
| 2009/0278843 A1* | 11/2009 | Evans | ............ | G06F 30/00 703/1 |
| 2009/0282782 A1* | 11/2009 | Walker | ............ | B65B 43/10 700/95 |
| 2009/0287717 A1* | 11/2009 | Gombert | ............ | G06F 30/00 |
| 2010/0043354 A1* | 2/2010 | Paltiel | ............ | G06T 11/60 53/411 |
| 2011/0054849 A1* | 3/2011 | Walker | ............ | G06F 30/00 703/1 |
| 2011/0179383 A1 | 7/2011 | Morris | | |
| 2013/0001236 A1* | 1/2013 | Block | ............ | B65D 5/0227 229/166 |
| 2013/0120770 A1* | 5/2013 | Mandel | ............ | G06Q 10/10 358/1.14 |
| 2014/0040319 A1* | 2/2014 | Morgana | ............ | G06F 30/39 707/803 |
| 2014/0379111 A1* | 12/2014 | Rameau | ............ | G06F 30/00 700/97 |
| 2015/0314936 A1* | 11/2015 | Stack, Jr. | ............ | B65D 5/5035 206/488 |
| 2015/0331965 A1* | 11/2015 | Eschbach | ............ | G06F 30/00 493/56 |
| 2015/0346977 A1* | 12/2015 | Dubois | ............ | G06T 19/00 715/765 |
| 2020/0117338 A1 | 4/2020 | Lukac et al. | | |

OTHER PUBLICATIONS

"Combined Search and Examination Report", GB Application No. 1911513.8, dated Jan. 29, 2020, 5 pages.
"Final Office Action", U.S. Appl. No. 16/296,047, dated Nov. 10, 2020, 14 pages.
"Foreign Office Action", GB Application No. 1911513.8, dated Dec. 2, 2020, 3 pages.
"First Action Interview Office Action", U.S. Appl. No. 16/296,047, dated Aug. 13, 2020, 7 pages.
"Foreign Office Action", GB Application No. 1911513.8, dated May 24, 2021, 3 pages.
"Non-Final Office Action", U.S. Appl. No. 16/296,047, dated Apr. 28, 2021, 19 pages.
"Final Office Action", U.S. Appl. No. 16/296,047, dated Oct. 4, 2021, 17 pages.
"Foreign Office Action", AU Application No. 2019213452, dated Oct. 29, 2021, 4 pages.

* cited by examiner

NEIGHBORING PANEL VIEW

RELATED APPLICATION

This application claims priority under 35 U.S.C. § 119(e) to U.S. Provisional Patent Application No. 62/745,641, filed Oct. 15, 2018, and titled "Object Folding Tool," the entire disclosure of which is hereby incorporated by reference.

BACKGROUND

Creating product packaging designs typically occurs in a 2D context of a package dieline, but these designs are intended to be viewed on a three-dimensional (3D) fabricated package. For instance, conventional systems enable designers to interact with a 2D representation of an unassembled object (e.g., a digital representation of a dieline) in order to place graphics for the assembled 3D object (e.g., a box, a bag, a foil wrapper, or an envelope). However, this forces users of conventional systems to visualize how a graphic placed on the 2D representation of the unassembled object will appear on the 3D assembled object. Doing so requires extraordinary spatial imagination, especially for objects with a complex shape or when designing graphics which extend across multiple panels of the assembled object. This disconnect between the 2D unassembled object and the 3D assembled object makes it difficult to accurately place graphics onto the object, restricts the ability of the user to design an aesthetically attractive object, and often results in errors in the final assembled object.

SUMMARY

To overcome these problems, a neighboring panel view is leveraged in a digital medium environment. Initially, a view generation system receives a selection of panels of a three-dimensional (3D) assembled representation of an object, such as to apply digital graphics to the 3D assembled representation. The view generation system also receives a selection of an option to display a neighboring panel view, which is a two-dimensional (2D) flattened view local to the selection. In particular, the neighboring panel view displays an arrangement of the selected panels of the object and their neighboring panels. The view generation system arranges the selected panels in this arrangement as those panels are arranged in the 3D assembled representation. The view generation system also arranges the neighboring panels in the neighboring panel view adjacent to the selected panels with which they are adjacent on the object.

This neighboring panel view contrasts with display of a 2D unassembled representation of the object. Panels selected from the 3D assembled representation comprising a single face of the object may not be contiguous, may be rotated relative to one another, and may not be proximately positioned in the 2D unassembled representation. By displaying the selected panels in 2D and flattened as well as arranged as in the 3D assembled representation, however, the neighboring panel view eliminates the disconnect between 2D unassembled and 3D assembled representations of an object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
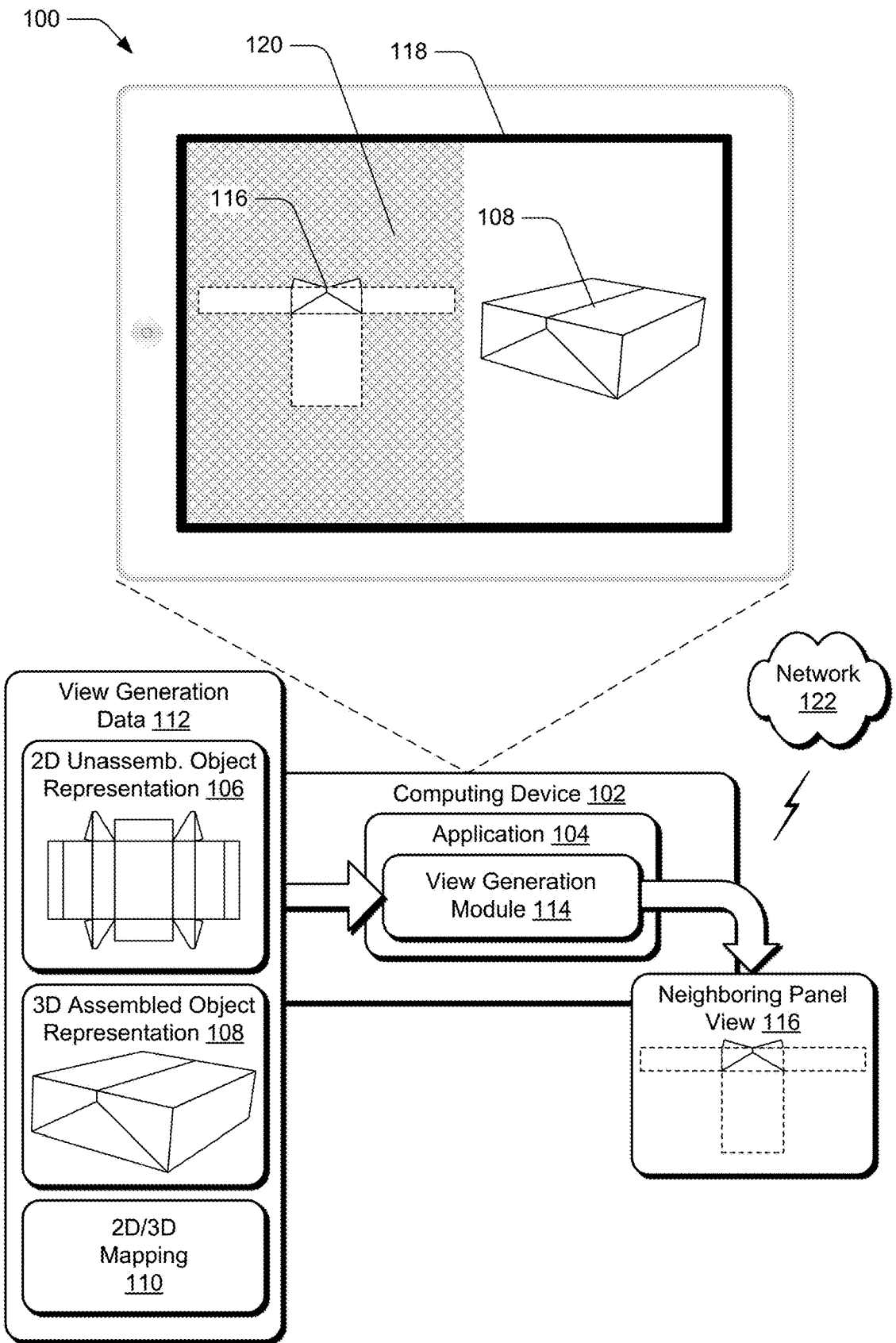
FIG. 1 is an illustration of an environment in an example implementation that is operable to employ techniques described herein.

Conventional systems enable designers to interact with a two-dimensional (2D) representation of an unassembled object (e.g., a digital representation of a dieline) in order to place graphics for the assembled three-dimensional (3D) object (e.g., a box, a bag, a foil wrapper, an envelope, or clothing). The disconnect between the 2D unassembled object representation and the 3D assembled object makes it difficult to accurately place graphics onto the object, restricts the ability of the user to design an aesthetically attractive object, and often results in errors in the final assembled object.

To overcome these problems, a neighboring panel view is leveraged in a digital medium environment. Initially, a view generation system receives a selection of panels of a 3D assembled representation of an object, such as to apply digital graphics to the 3D assembled representation. The view generation system also receives a selection of an option to display a neighboring panel view, which is a 2D flattened view local to the selection. In particular, the neighboring panel view displays an arrangement of the selected panels of the object and their neighboring panels.

To generate the neighboring panel view, the view generation system identifies the panels of the object that neighbor the selected panels. In one or more implementations, the view generation system identifies these neighboring panels using the 2D unassembled representation of the object. In such cases, the identified neighboring panels neighbor the selected panels on the 2D unassembled representation, e.g., the dieline. In this case, the term "neighboring" refers to a panel of the 2D unassembled representation being disposed adjacent to a selected panel without any other panels disposed between the neighboring panel and the selected panel. The neighboring panel abuts the selected panel in the 2D unassembled representation such that only a crease may be disposed between the neighboring panel and the selected panel.

Additionally or alternately, the view generation system is capable of identifying these neighboring panels using the 3D assembled representation of the object. In such cases, the identified neighboring panels neighbor the selected panels on the 3D assembled representation, e.g., a visualization of an assembled object. It is to be appreciated that by assembling the object into an assembled state, different panels may neighbor the selected panels than in an unassembled state. By way of example, a panel may be disposed adjacent to a selected panel as a result of folding the unassembled object along one or more creases. Consequently, in this case the term "neighboring" refers to a panel of the 3D assembled representation being disposed adjacent to a selected panel (e.g., with only a crease between, as a result of assembly, and so on) without any other panels being disposed between the neighboring panel and the selected panel. Regardless of whether the neighboring panels are identified with reference to the 2D unassembled representation or the 3D assembled representation of the object, the neighboring panels may be identified in a variety of ways as described in more detail below.

Once the neighboring panels are identified, the view generation system arranges the selected panels and the neighboring panels into the neighboring panel view. In particular, the view generation system arranges the selected panels as those panels are arranged in the 3D assembled representation of the object. In scenarios where the selected panels form a face of the 3D assembled representation, for instance, the view generation system arranges those panels in the neighboring panel view as arranged to form the face. Additionally, the view generation system arranges the neighboring panels in the neighboring panel view adjacent to the selected panels to which they are adjacent on the object— depending on whether the neighboring panels were identified by leveraging the 2D unassembled representation of the object or the 3D assembled representation of the object. In any case, the arrangement of selected and neighboring panels is flattened for application of digital graphics. Once the view generation system generates the neighboring panel view, the system can display the view on a display device, such as via a user interface of a graphics design application.

Indeed, this neighboring panel view contrasts with display of the 2D unassembled representation of the object. Panels selected from the 3D assembled representation comprising a single face of the object may not be contiguous, may be rotated relative to one another, and may not be proximately positioned in the 2D unassembled representation. By displaying the selected panels in 2D and flattened as well as arranged as in the 3D assembled representation, however, the view generation system eliminates the disconnect between 2D unassembled and 3D assembled representations of an object. In this way, the view generation system provides a variety of advantages, including providing interfaces that enable designers to accurately place graphics onto an object and view how these graphics will appear on portions of the final 3D assembled object. Doing so reduces user interaction and frustration involved in graphic design of packaging and clothing. Moreover, providing the described visualizations eliminates uncertainty regarding the final design of the assembled object and reduces errors in the placement of graphics for the final assembled object.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 8.

The computing device 102 is illustrated as including an application 104. The application 104 represents functionality of the computing device 102 to create and modify digital content, such as to create and modify digital photographs, create and modify raster graphics, create and modify vector graphics, apply created graphic elements (e.g., created digital photographs, raster graphics, and vector graphics) to digital representations of objects, and so forth. In the context of the described techniques, for instance, the application 104 is usable to apply created graphic elements to digital dielines and three-dimensional (3D) representations of assembled objects (e.g., boxes, cartons, bags, envelopes, packaging sleeves, and so on) corresponding to such digital dielines. The application 104 is also usable to apply created graphic elements to other views corresponding to a digital dieline or 3D representation, such as the neighboring panel view discussed herein. In addition to applying graphic elements to packaging, the application 104 can be further used to apply graphics elements to digital patterns and 3D representations of other types of assembled objects corresponding to the digital patterns, such as foil wrappers and clothing.

In connection with this functionality, consider two-dimensional (2D) unassembled object representation 106 and 3D assembled object representation 108. One example of the 2D unassembled object representation 106 is a "dieline," though the 2D unassembled object representation 106 may correspond to other unassembled (e.g., unfolded) objects, such as unfolded origami, clothing patterns, and foil-wrapper patterns, without departing from the spirit or scope of the described techniques. The 3D assembled object representation 108 corresponds to an object formed by folding or otherwise assembling the unassembled object represented via the 2D unassembled object representation 106.

In various scenarios, the unassembled object represented by the 2D unassembled object representation 106 may be transferred to the real world, at least in part, by printing graphics applied to the representation on a sheet of foldable material (e.g., paper, cardboard, metal, fabric, foil, and so on) and cutting the material in a shape indicated by the representation. Other operations may also be performed as part of transferring the unassembled object to the real world, such as perforating the material, scoring the material, pressing creases into the material where it is to be folded to form the corresponding assembled object, gluing the material, sewing the material, and so forth. Regardless, the real-world unassembled object may be folded or otherwise assembled (e.g., by a machine or a user) to form the corresponding real-world assembled object, as represented by the 3D assembled object representation 108.

The illustrated environment 100 also includes 2D/3D mapping 110. Broadly speaking, the 2D/3D mapping 110 describes a mapping between panels of the 2D unassembled object representation 106 and corresponding faces of the 3D assembled object representation 108. The 2D/3D mapping 110 may be configured as a two-way mapping. By way of example, one or more components of the computing device 102 (or another computing device) can "look up," in the 2D/3D mapping 110, a panel from the 2D unassembled object representation 106 and identify the corresponding one or more faces of the 3D assembled object representation 108. This is because the mapping describes these one or more faces as corresponding to the panel. These one or more components can also "look up," in the 2D/3D mapping 110, a face of the 3D assembled object representation 108 and identify the corresponding one or more panels of the 2D unassembled object representation 106. This is because the mapping describes these one or more panels as corresponding to the face. In one or more implementations, the computing device 102 includes functionality to determine this mapping between the 2D unassembled object representation 106 and 3D assembled object representation 108.

In the illustrated environment 100, the 2D unassembled object representation 106, the 3D assembled object representation 108, and the 2D/3D mapping 110 are included in view generation data 112. Further, the view generation data 112 is shown as input to view generation module 114. The view generation module 114 is configured to generate a variety of views for display in connection with graphic design of packaging, clothing, and so on. In accordance with the described techniques, for instance, the view generation module 114 generates a neighboring panel view 116 based on the view generation data 112. It is to be appreciated that the view generation data 112 may include different information than depicted without departing from the described techniques. For example, the view generation data 112 may include only the 2D unassembled object representation 106 and the 3D assembled object representation 108. In this case, the view generation module 114 may determine the mapping between these 2D and 3D representations and generate the 2D/3D mapping 110 data to memorialize the determined mapping.

As noted above, there may be a disconnect between display of visual modifications as applied to the 3D assembled object representation 108 and display of the visual modifications as applied to the corresponding portion of the 2D unassembled object representation 106. This may be in part because the visual modifications may be applied to panels of the 2D unassembled object representation 106 that are not contiguous with one another, are not proximate one another, are rotated differently from an orientation in which they are disposed in the 3D assembled object representation 108, and so forth. Thus, displaying visual modifications in real-time as they are made to the 3D assembled object representation 108 concurrently on the neighboring panel view 116—a view that displays panels selected for the modifications as assembled and flattened—provides a variety of advantages. These advantages include reducing user interaction involved in graphic design of packaging and clothing. To enable such concurrent display, the application 104 leverages the view generation module 114. Generally speaking, the view generation module 114 represents functionality to generate the neighboring panel view 116 given the view generation data 112 as input.

To generate the neighboring panel view 116, the view generation module 114 receives a selection of a face, or panels forming a face, of the 3D assembled object representation 108. The view generation module 114 then identifies the panels that neighbor the selected panels in the 2D unassembled object representation 106. Additionally or alternately, the view generation module 114 may identify the panels that neighbor the selected panels in the 3D assembled object representation 108. In any case, once the neighboring panels are identified, the view generation module 114 arranges the panels into a 2D flattened view in which the selected panels are disposed together as they are assembled in the 3D assembled object representation 108, e.g., when multiple panels form a face the multiple panels are arranged as the face.

In this 2D flattened view, the view generation module 114 attaches the neighboring panels to the selected panels along creases between neighboring and selected panels, e.g., when the neighboring panels are identified from the 2D unassembled object representation 106. When the neighboring panels are identified from the 3D assembled object representation 108 though, the view generation module 114 attaches the neighboring panels to the selected panels along creases or along adjacent edges, e.g., when a panel is folded to be disposed adjacent to a selected panel) between neighboring and selected panels. Moreover, the neighboring panel view 116 displays the determined arrangement of selected and neighboring panels in a 2D flattened view without including other panels of the object. It is to be appreciated that although the examples describe displaying the neighboring panel view 116 concurrently with the 3D assembled object representation 108, the neighboring panel view 116 may also be displayed without the 3D assembled object representation 108 in one or more scenarios without departing from the spirit or scope of the described techniques.

Once the view generation module 114 generates the neighboring panel view 116, the view generation module 114 can cause both the 3D assembled object representation 108 and the neighboring panel view 116 to be displayed concurrently, such as on a display device 118 of the computing device 102.

In one or more implementations, the 3D assembled object representation 108 and the neighboring panel view 116 are displayed concurrently via a user interface 120 of the application 104. This user interface 120 represents functionality to receive user input to apply graphics to the neighboring panel view 116 and the 3D assembled object representation 108, such that when user input is received to apply a graphic to the neighboring panel view 116, the view generation module 114 also causes the user interface 120 to display the graphic being concurrently applied to corresponding portions of the 3D assembled object representation 108. Similarly, when user input is received to apply a graphic to the 3D assembled object representation 108, the view generation module 114 causes the user interface 120 to display the graphic being concurrently applied to corresponding portions of the neighboring panel view 116.

Although illustrated as implemented locally at the computing device 102, functionality of the illustrated view generation module 114 may also be implemented in whole or part via functionality available via network 122, such as part of a web service or "in the cloud." It is also to be appreciated that data representing the neighboring panel view 116 and the 3D assembled object representation 108 may be maintained remotely and/or communicated over the network 122, though depicted at the computing device 102 in the illustrated example.

Having considered an example environment, consider now a discussion of some example details of the techniques for neighboring panel views in a digital medium environment in accordance with one or more implementations.

Neighboring Panel View

Figure 2:
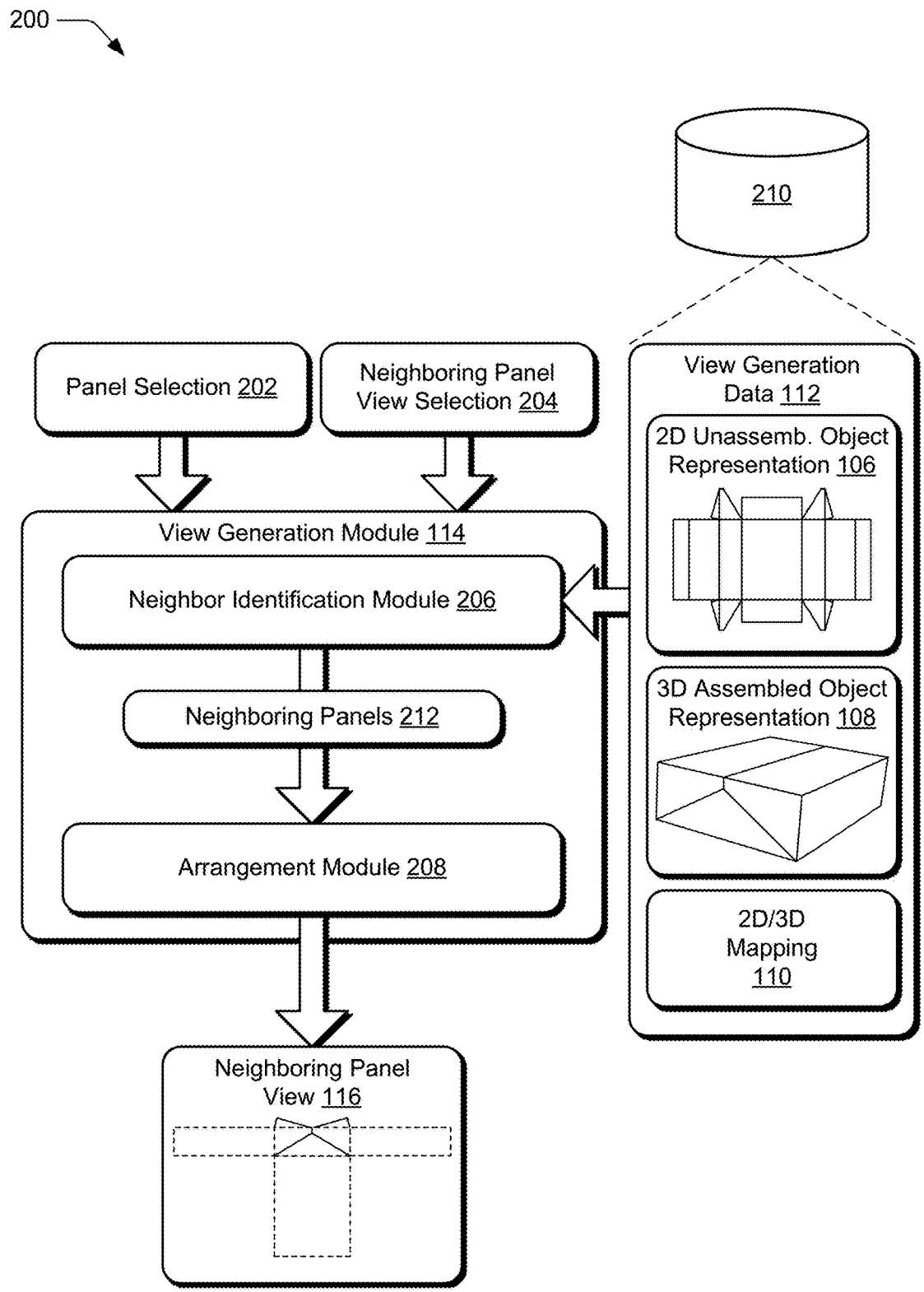
FIG. 2 depicts an example system in which the view generation module of FIG. 1 generates a flattened two-dimensional (2D) view in which selected panels, corresponding to a face of a three-dimensional (3D) representation of an assembled object, are displayed with neighboring panels.

FIG. 2 depicts an example system 200 in which a view generation module of FIG. 1 generates a flattened two-dimensional (2D) view in which selected panels, corresponding to a face of a three-dimensional (3D) representation of an assembled object, are displayed with neighboring panels. The illustrated system 200 includes from FIG. 1 the view generation module 114.

The view generation module 114 is depicted receiving panel selection 202 and neighboring panel view selection 204. The panel selection 202 represents data that describes panels of the 3D assembled object representation 108 that have been selected according to user input, such as panels selected as a focus for application of graphics. The panels of the 3D assembled object representation 108 that have been selected may also correspond to one or more faces of the 3D assembled object representation 108 that have been selected according to user input.

In contrast, the neighboring panel view selection 204 represents data describing a selection of an option to display the neighboring panel view 116. By way of example, an interface of the application 104 may include an instrumentality (e.g., a checkbox, radio button, etc.) that is selectable to cause the neighboring panel view 116 to be generated and displayed. Display of the neighboring panel view 116 may also be initiated responsive to receipt of various other types of neighboring panel view selections 204, such as voice input, keyboard shortcuts, menu selections, and so forth. One example of receiving the panel selection 202 and the neighboring panel view selection 204 are discussed in relation to FIG. 3.

Figure 3:
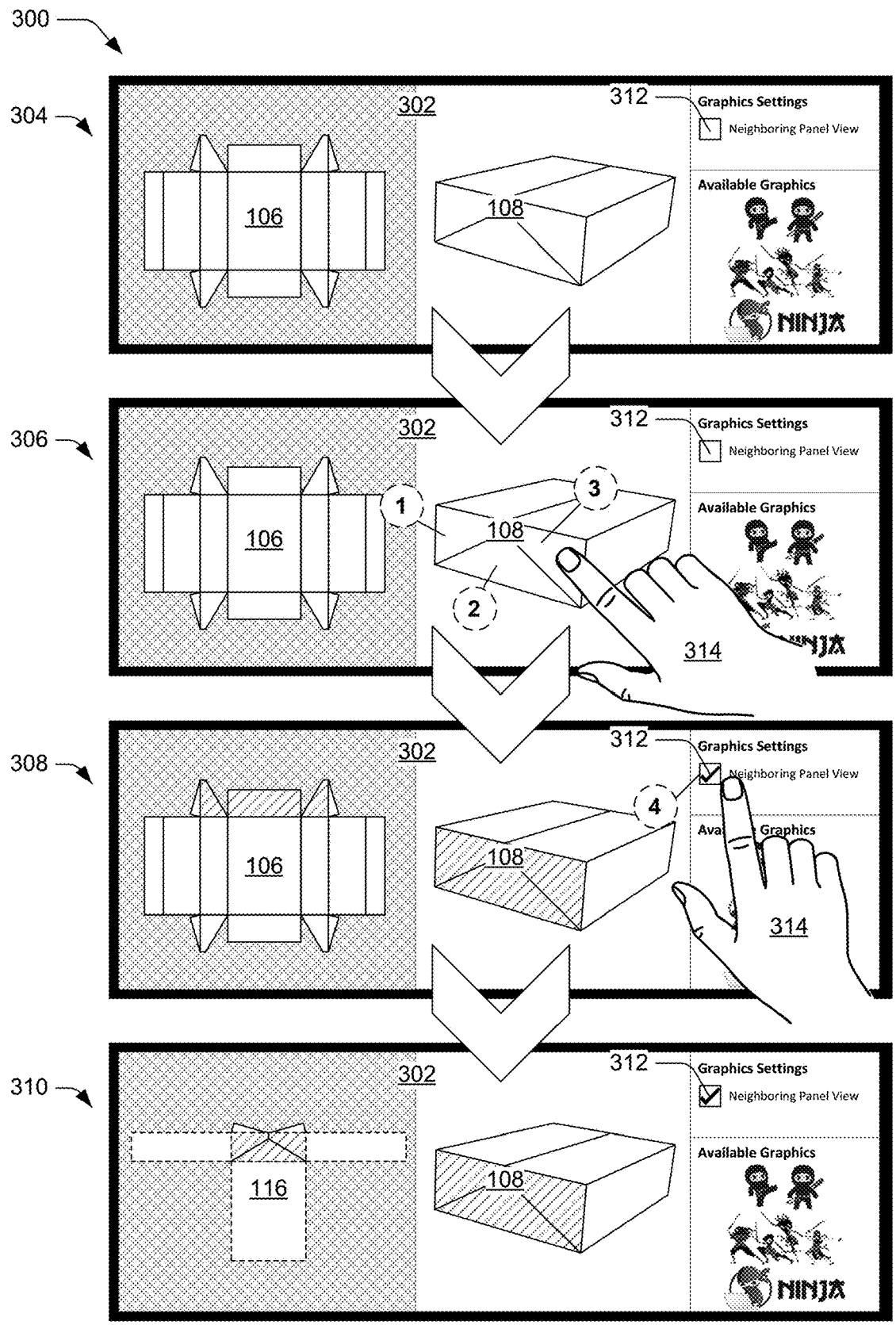
FIG. 3 depicts an example scenario in which user selections are received via a user interface displaying the 3D representation of the assembled object to generate the flattened 2D view having the selected and neighboring panels.

FIG. 3 depicts an example 300 of a scenario in which user selections are received via a user interface displaying the 3D representation of the assembled object to generate the flattened 2D view having the selected and neighboring panels.

In particular, the example 300 depicts user interface 302 at four different stages, including first stage 304, second stage 306, third stage 308, and fourth stage 310. In the first stage 304, the user interface 302 includes a view displaying the 2D unassembled object representation 106 and a view displaying the 3D assembled object representation 108. The user interface 302 also includes these two views in the second and third stages 306, 308. The first stage 304 represents a portion of the scenario before any of the panels of the 3D assembled object representation 108 have been selected, e.g., before the panel selection 202 is received. The first stage 304 also represents a scenario before an option to display a neighboring panel view is selected, e.g., before the neighboring panel view selection 204 is received. In this context, the user interface 302 also includes neighboring panel view option 312, which is selectable to display the neighboring panel view 116.

The second stage 306 represents a portion of the example scenario 300 in which panels of the 3D assembled object representation 108 are selected based on user input. In other words, the second stage 306 represents a portion of the example scenario 300 in which the panel selection 202 is received. In particular, the second stage 306 depicts a hand 314 of a user providing touch input to select three panels of the displayed 3D assembled object representation 108. These touch inputs are represented at the second stage 306 with the illustrated circles having numbers '1', '2', '3.' This indicates that the user's hand 314 provided three separate inputs to select the three panels.

Nevertheless, it is to be appreciated that a user may provide a single input to select multiple panels, such as a scribble input over multiple panels. Additionally or alternately, input may be received to select a face of the 3D assembled object representation 108 rather than individual panels, such as by receiving one face selection input rather than a number of panel selection inputs corresponding to a number of panels forming the one face. Additionally, although the illustrated example 300 depicts receiving the panel selection 202 as touch input, the panel selection 202 may correspond to other types of input without departing from the spirit or scope of the described techniques, such as mouse input, keyboard input, stylus input, voice input, non-touching gesture input, and so forth.

The third stage 308 represents a portion of the example scenario 300 in which the neighboring panel view option 312 is selected based on user input. In other words, the third stage 308 represents a portion of the example scenario 300 in which the neighboring panel view selection 204 is received. In particular, the third stage 308 depicts the hand 314 of the user providing touch input to select the displayed neighboring panel view option 312. This touch input is represented at the third stage 308 with the illustrated circle having the number '4.' Selection of the neighboring panel view option 312 is further represented through inclusion of the depicted checkmark. As noted above, it is to be appreciated that various types of input may be received to initiate display of the neighboring panel view 116. The illustrated scenario 300 merely depicts one example in which user input is received via an interface instrumentality to initiate such display.

The fourth stage 310 represents a portion of the example scenario 300 in which the neighboring panel view 116 is displayed via the user interface 302 concurrently with the 3D assembled object representation 108. By way of example, the view generation module 114 configures the user interface 302 in this way responsive to receiving the panel selection 202 and the neighboring panel view selection 204. Although the panel selection 202 is received before the neighboring panel view selection 204 in the illustrated scenario 300, it is to be appreciated that in other scenarios the neighboring panel view selection 204 may be received before the panel selection 202. In any case, the view generation module 114 is capable of generating the neighboring panel view 116 and causing it to be displayed via a user interface, such as the user interface 302. In this context, consider the following further discussion of FIG. 2.

In the illustrated system 200, the view generation module 114 includes neighbor identification module 206 and arrangement module 208. Broadly speaking, these modules represent functionality of the view generation module 114 to generate and cause display of the neighboring panel view 116. In particular, the neighbor identification module 206 and the arrangement module 208 represent functionality to generate and cause display of the neighboring panel view 116 responsive to the neighboring panel view selection 204 and based on the panel selection 202 and the view generation data 112, which is illustrated as being maintained in storage 210. The storage 210 may correspond to storage that is local to the example system 200 or that is remote from the example system 200 and accessible via a communicable coupling, e.g., over the network 122. In any case, the view generation module 114 may include more or different modules than depicted to carry out the described functionality without departing from the spirit or scope of the described techniques.

The neighbor identification module 206 represents functionality to identify neighboring panels 212 of the panels described by the panel selection 202. In accordance with the described techniques, the neighbor identification module 206 identifies the neighboring panels 212 based on the 2D unassembled object representation 106, such that the neighboring panels 212 comprise the panels of the 2D unassembled object representation 106 that are adjacent to a selected panel, e.g., the neighboring panels 212 only have a crease between them and a selected panel, and there are no other panels disposed between the neighboring panels and the selected panels.

To identify the neighboring panels 212 based on the 2D unassembled object representation 106, the neighbor identification module 206 may traverse the 2D unassembled object representation 106 outwardly from each of the selected panels. Additionally or alternately, the neighbor identification module 206 may process vectors for each of the panels that indicate a normal of a respective panel when the object is assembled. The neighbor identification module 206 may identify the panels of the 2D unassembled object representation 106 that correspond to the neighboring panels 212 based on those normal vectors. The neighbor identification module 206 may identify the neighboring panels 212 using the 2D unassembled object representation 106 in other ways without departing from the spirit or scope of the described techniques.

Additionally or alternately, the neighbor identification module 206 may identify the neighboring panels 212 based on the 3D assembled object representation 108, such that the neighboring panels 212 comprise the panels of the 3D assembled object representation 108 that are adjacent to a selected panel, e.g., the neighboring panels 212 may have only a crease between them and a selected panel, may be arranged in a folded position so that they are disposed adjacent to a selected panel, and so on.

In this way, a panel that is folded over another panel—a superior panel to an inferior panel over which it is folded—may thus be disposed "adjacent" to a selected panel in the 3D assembled object representation 108. Accordingly, such a panel is identified as one of the neighboring panels 212. In contrast, the inferior panel covered by the superior panel may not be identified as one of the neighboring panels 212. This is because the inferior panel is covered by the superior panel and a contiguous design may not be visible on the inferior panel when covered by the superior panel. If a portion of such an inferior panel is exposed in the 3D assembled object representation 108, however, the inferior panel may be identified as one of the neighboring panels 212 so that the exposed portion can be included as part of the neighboring panel view 116. Regardless, there are no other panels of the 3D assembled object representation 108 disposed between the neighboring panels and the selected panels.

The neighbor identification module 206 may identify these neighboring panels 212 in a variety of ways such as by traversing the 3D assembled object representation 108, based on normal vectors of the 3D assembled object representation 108's panels, and so forth. The neighbor identification module 206 may identify the neighboring panels 212 using the 3D assembled object representation 108 in other ways without departing from the spirit or scope of the described techniques.

Once the neighboring panels 212 are identified, the arrangement module 208 arranges the selected panels and the neighboring panels 212 into the neighboring panel view 116. In one or more implementations, the arrangement module 208 carries this out, in part, by determining transformations (e.g., rotations and translations) between the selected panels as positioned in the 2D unassembled object representation 106 and as positioned in the 3D assembled object representation 108. The arrangement module 208 can also determine transformations (e.g., rotations and translations) between the neighboring panels 212 as positioned in the 2D unassembled object representation 106 and as positioned in the 3D assembled object representation 108. The translations include translations between different planes, such as when the neighboring panels 212 are not coplanar with the selected faces in the 3D assembled object representation 108.

In any case, the arrangement module 208 generates the neighboring panel view 116 by arranging the selected panels and the neighboring panels 212 based, in part, on the determined transformations of those panels. These determined transformations are also used to apply graphics to the 2D unassembled object representation 106, when edits are made to the neighboring panel view 116. In this context, consider FIGS. 4A, 4B.

Figure 4A:
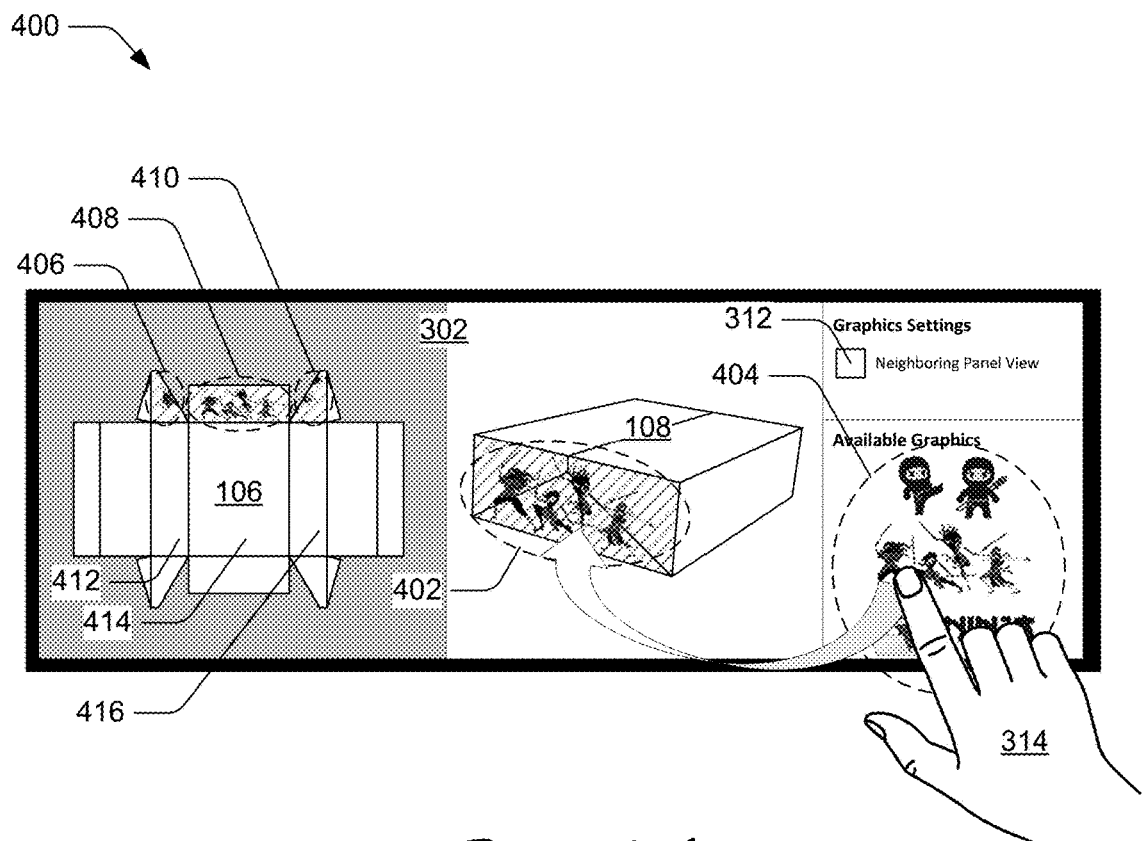
FIG. 4A depicts an example user interface via which a graphics object is added to the 3D representation of the assembled object and a 2D representation of a corresponding unassembled object.
Figure 4B:
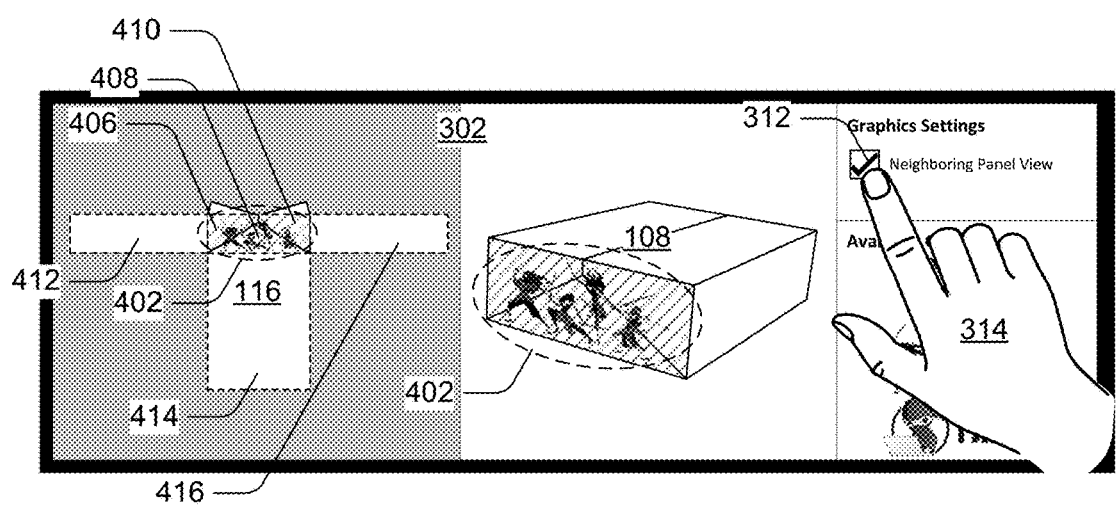
FIG. 4B depicts another example of the user interface in which the flattened 2D view having the selected and neighboring panels is displayed instead of the 2D representation of the unassembled object.

FIGS. 4A and 4B depict examples 400 of a user interface in accordance with one or more implementations. In particular, FIG. 4A depicts an example of a user interface via which a graphics object is added to the 3D representation of the assembled object and a 2D representation of a corresponding unassembled object. FIG. 4B depicts another example of the user interface in which the flattened 2D view having the selected and neighboring panels is displayed instead of the 2D representation of the unassembled object.

The illustrated examples 400 both include the user interface 302. The illustrated user interface 302 also includes a view of the 3D assembled object representation 108 and the neighboring panel view option 312. The user interface 302 is depicted displaying a view of the 2D unassembled object representation 106 (e.g., a dieline) in FIG. 4A. By contrast, the user interface 302 is depicted displaying the neighboring panel view 116 instead of the 2D unassembled object representation 106 in FIG. 4B.

In FIG. 4A the hand 314 of the user is depicted dragging a graphic 402 from the available graphics 404 to the 3D assembled object representation 108. Detection of such an input is effective to apply the graphic 402 to the indicated face of the 3D assembled object representation 108. In this example, the indicated face corresponds to multiple different panels of the 2D unassembled object representation 106. Indeed, graphics may be applied to the 3D assembled object representation 108 and the 2D unassembled object representation 106 in different ways, in addition to such dragging, without departing from the spirit or scope of the described techniques.

In FIG. 4A also, the neighboring panel view option 312 is depicted as not selected. As a result, the 2D unassembled object representation 106 is displayed via the user interface 302, e.g., rather than the neighboring panel view 116. Notably, the graphic 402 as depicted on the 2D unassembled object representation 106 is applied to multiple different panels 406, 408, 410 of the 2D unassembled object representation 106. At least a portion of the graphic 402 is applied to each of these panels 406, 408, 410 by reproducing the graphic 402 for each panel, transforming the graphic 402 (e.g., translation and rotation), and clipping the graphic 402 based on a shape of the panel (e.g., by applying a clipping mask having a shape of the panel).

In FIG. 4B, the hand 314 of the user is depicted selecting the neighboring panel view option 312. Based on this selection, the neighboring panel view 116 is displayed via the user interface 302. In contrast to the view of the 2D unassembled object representation 106, the neighboring panel view 116 includes the graphic 402 applied contiguously to the above-noted multiple panels, e.g., which correspond to the face of the 3D assembled object representation 108 to which the graphic 402 is applied. Moreover, these particular panels are arranged in the neighboring panel view 116 in an arrangement that corresponds to their positions when the object is assembled, as in the 3D assembled object representation 108.

This neighboring panel view 116 thus provides the advantage of displaying how graphics will look on panels of an object when it is assembled, e.g., folded, glued, sewn, and so on. This contrasts with the view of the 2D unassembled object representation 106, which displays graphics as they will look on the object when it is unassembled, e.g., unfolded, unglued, unsewn, and so on. However, there may be a disconnect for users between how graphics look on the object when it is unassembled and how the graphics look on the object when assembled. The neighboring panel view 116 removes this disconnect for at least the selected panels and their neighboring panels, namely, by displaying the selected panels as they appear assembled and with the neighboring panels for local context.

The following discussion describes the panels of the 2D unassembled object representation 106 that correspond to the panels of the neighboring panel view 116 in the illustrated example 400. The panels 406, 408, 410 correspond to the selected panels as indicated by the hashing. In the 2D unassembled object representation 106 of FIG. 4A, the panels 406, 408, 410 are depicted discontinuous with one another and each include different portions of the graphic 402. In the neighboring panel view 116 of FIG. 4B, the panels 406, 408, 410 are depicted as arranged in the 3D assembled object representation 108. Here, the graphic 402 is displayed as contiguous and singular across the panels 406, 408, 410. In the neighboring panel view 116 and the 2D unassembled object representation 106, the neighboring panels 412, 414, 416 are also identified. In accordance with the described techniques, the view generation module 114 is also configured to generate additional flattened views of selected and neighboring panels. In this context, consider FIG. 5.

Figure 5:
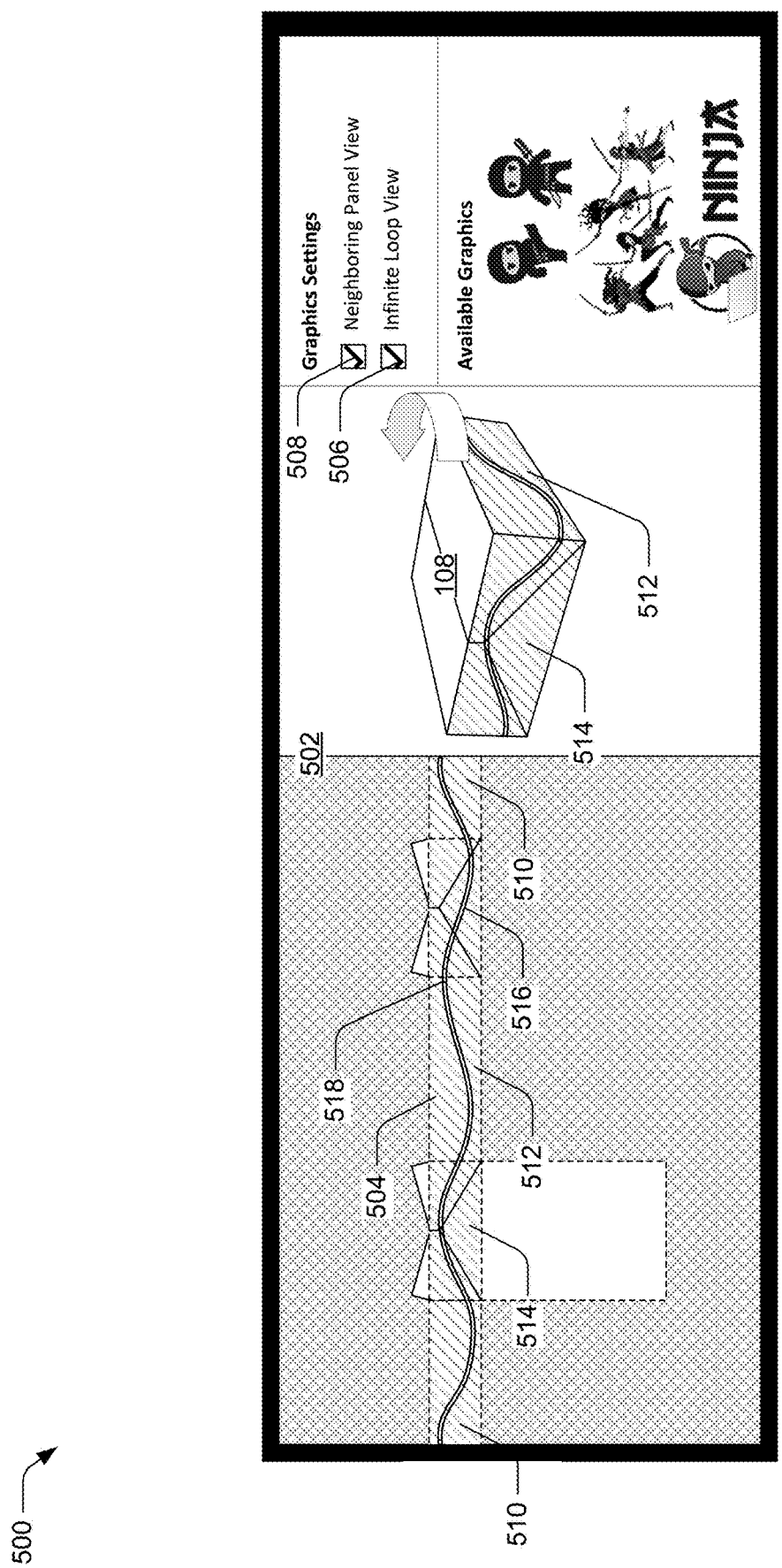
FIG. 5 depicts an example user interface in which a flattened 2D view includes selected panels that correspond to a loop of sidewall panels around the 3D representation of the assembled object.

FIG. 5 depicts an example 500 of a user interface in which a flattened 2D view includes selected panels that correspond to a loop of sidewall panels around the 3D representation of the assembled object.

The illustrated example 500 includes a graphical user interface 502, which includes a view of the 3D assembled object representation 108. The user interface 502 also includes an infinite loop view 504, infinite loop view option 506, and neighboring panel view option 508.

In the illustrated example 500, both the infinite loop view option 506 and the neighboring panel view option 508 are depicted selected. These options may be selected in various ways as discussed above, such as based on touch input, stylus input, mouse input, voice commands, keyboard shortcuts, and so forth. Regardless of how selected, selection of the neighboring panel view option 508 causes neighboring panels of selected panels to be displayed as part of the infinite loop view 504.

The infinite loop view option 506 causes a loop around the 3D assembled object representation 108 to be displayed "infinitely" via the infinite loop view 504. In this particular example, the infinite loop view 504 allows a user to scroll infinitely in horizontal directions, such that as portions of the loop are "scrolled off" one side of the view these portions are "scrolled on" an opposite side of the view. By way of example, the infinite loop view 504 includes selected panels 510, 512 and selected faces 514, 516. Consider a case in which user input is received to scroll the infinite view loop 504 to the left, such that the portion of the selected panel 510 depicted on the left of the view is scrolled off the view—reducing the portion of the selected panel 510 on the left. As portions of the selected panel 510 are scrolled off the view on the left, those portions are scrolled on to the view on the right, increasing the portion of the selected panel 510 depicted on the right of the view. If user input to scroll to the left continues, eventually the selected face 514 will scroll off the view on the left and back onto the view on the right, then the selected panel 512 will scroll off the view on the left and back on the view on the right, and so on. Certainly, user input to scroll in the opposite direction (e.g., to the right) may also be received.

Although the illustrated example 500 depicts a scenario in which a loop, comprising sidewall panels and faces of the 3D assembled object representation 108, is selected for the infinite loop view 504, it is to be appreciated that loops comprising other panels may be selected for the infinite loop view 504. By way of example, a loop comprising the selected face 514, a top face of the 3D assembled object representation 108, the selected face 516, and a bottom face of the 3D assembled object representation 108 may be selected for the infinite loop view 504. Said another way, this second example loop includes the front, top, back, and bottom faces of the object, as assembled. A third example loop including the right-side, top, left-side, and bottom faces of the object may also be selected for the infinite loop view 504. Indeed, various loops around objects may be selected for the infinite loop view 504. Moreover, the infinite loop view 504 may scroll in different directions than horizontally for different loops. In connection with the just described second loop, for instance, the infinite loop view 504 may scroll infinitely in vertical directions.

This infinite loop view 504 provides the advantage of displaying graphics as they will be applied around a loop of an object. This allows graphics, patterns, and textures to be applied to the object during design so that when manufactured those graphics, patterns, and textures appear to be continuous around the loop. In other words, users interacting with the application 104 to apply graphic designs to an object can see via the infinite loop view 504 whether those designs will be continuous across neighboring panels of the object when it is assembled. If designs are not continuous across the neighboring panels, the user interface 502 allows designers to provide input to make them continuous. The illustrated example 500 includes curvy line 518 as an example of how a graphic may be applied to panels of an object to appear continuous across them.

In one or more implementations, the view of the 3D assembled object representation 108 and the infinite loop view 504 are linked together, such that responsive to user input to adjust the view of the 3D assembled object representation 108 the view generation module 114 causes a corresponding adjustment to the infinite loop view 504. Consider an example in which user input is received via the user interface 502 to rotate the 3D assembled object representation 108 counterclockwise, e.g., in the direction of the depicted arrow and such that the selected panel 510 of the 3D assembled object representation 108 is revealed for display via the user interface 502. In this example, the view generation module 114 causes a corresponding adjustment to the infinite loop view 504 output via the user interface 502, such as to "slide" the view to the right. In particular, the view generation module 114 may cause the portion of the selected panel 510 displayed at the right of the view to be scrolled off the view and scrolled back on to the left of the view, e.g., increasing a size of the selected panel 510 at the left side of the view. If user input is received to rotate the 3D assembled object representation 108 far enough in the counterclockwise direction, the selected face 516 of the 3D assembled object representation 108 may be revealed for display. In this scenario, the view generation module 114 can cause the selected face 516 to be scrolled off the infinite loop view 504 at the right and back onto the view at the left.

In addition to causing corresponding adjustments to the infinite loop view 504, the view generation module 114 is configured to cause a corresponding adjustment to the view of the 3D assembled object representation 108 in response to user input to adjust the infinite loop view 504. In this way, the view generation module 114 maintains a context across different views of the object as to where visual modification operations (e.g., application of graphics) are performed on the object. In one or more implementations, a user may select to center a face or a panel of the object in one of the views. Given this, the view generation module 114 causes a corresponding adjustment to the other view to also center the face or panel of the object in the other view.

In addition to leveraging the view generation module 114 to generate the described views for digital graphic application, the computing device 102 also includes functionality to generate a file based on graphics applied via the discussed 2D and 3D object representations as well as the neighboring panel view 116. This file may be usable to transfer the object to the real world, such as by including instructions which instruct a machine (e.g., printer, cutting machine, folding machine, etc.) how to form the unassembled object and/or assembled object from raw material (e.g., paper, cardboard, fabric, foil, etc.). The file may also include or be usable to generate human-understandable instructions for performing portions of transferring the object to the real world, such as instructions for folding an already printed and cut object in an unfolded state to form the folded object. In one or more implementations, for instance, the file may be usable by the computing device 102 or by another computing device accessible via network 120 to generate textual instructions, picture-based instructions where each picture depicts one or more folds in a sequence to form the assembled object, video-based instructions showing the sequence of folds to form the assembled object, and so forth Having discussed example details of the techniques for neighboring panel views, consider now some example procedures to illustrate additional aspects of the techniques.

Example Procedures

This section describes example procedures for neighboring panel views in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 having the view generation module 114 of FIG. 1.

Figure 6:
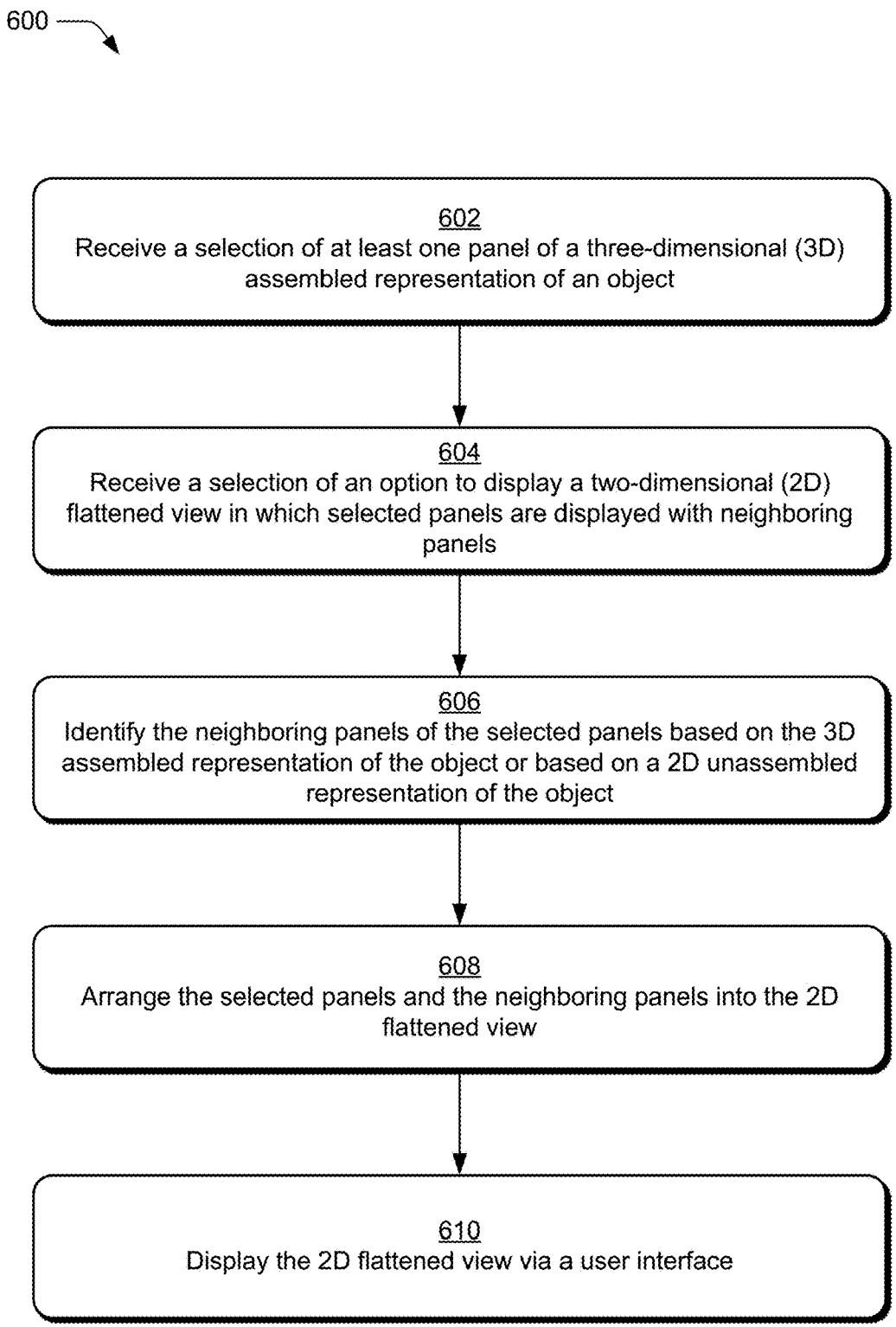
FIG. 6 depicts a procedure in an example implementation in which a flattened 2D view having the selected and neighboring panels is generated for display based on selection of panels from a 3D representation of an assembled object.

FIG. 6 depicts an example procedure 600 in which a flattened 2D view having the selected and neighboring panels is generated for display based on selection of panels from a 3D representation of an assembled object.

A selection is received of at least one panel of a three-dimensional (3D) assembled representation of an object by at least one computing device (block 602). By way of example, the view generation module 114 receives the panel selection 202, which describes panels of the 3D assembled object representation 108 that are selected, e.g., according to user input.

A selection is received of an option to display a two-dimensional (2D) flattened view in which selected panels are displayed with neighboring panels by the at least one computing device (block 604). By way of example, the view generation module 114 receives the neighboring panel view selection 204, such as based on user input to select the neighboring panel view option 312 via the user interface 302.

The neighboring panels of the selected panels are identified by the at least one computing device (block 606). In accordance with the principles discussed herein, the neighboring panels are identified based on either the 3D assembled representation of the object or based on a 2D unassembled representation of the object. By way of example, the neighbor identification module 206 identifies the neighboring panels 212 based on the 3D assembled object representation 108 or based on the 2D unassembled object representation 106. The neighbor identification module 206 may identify the neighboring panels 212 as discussed in more detail above.

The selected panels and the neighboring panels are arranged into the 2D flattened view by the at least one computing device (block 608). By way of example, the arrangement module 208 arranges the selected panels described by the panel selection 202 and the neighboring panels 212 into the neighboring panel view 116.

The 2D flattened view is displayed via a user interface by the at least one computing device (block 610). By way of example, the view generation module 114 causes the neighboring panel view 116 to be displayed via the user interface 302. The user interface 302 may be output for display, for instance, on the display device 118 of the computing device 102.

Figure 7:
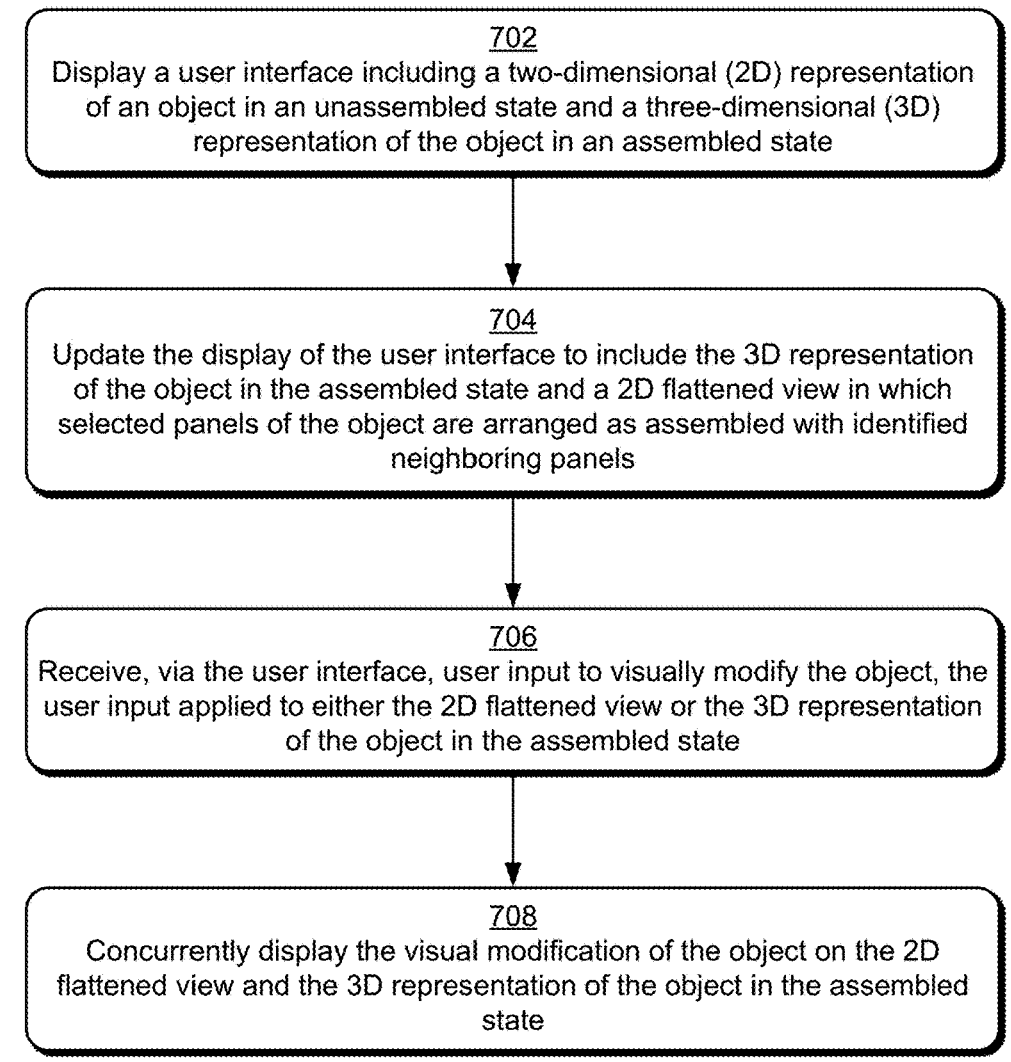
FIG. 7 depicts a procedure in an example implementation in which visual modification is displayed concurrently of a flattened 2D view having the selected and neighboring panels and a 3D representation of the object in an assembled state.

FIG. 7 depicts an example procedure 700 in which visual modification is displayed concurrently of a flattened 2D view having the selected and neighboring panels and a 3D representation of the object in an assembled state.

A user interface including a 2D representation of an object in an unassembled state and a 3D representation of the object in an assembled state is displayed by at least one computing device (block 702). By way of example, the computing device 102 displays the user interface 302 as depicted at stages 304, 306, 308, which includes a concurrent display of the 2D unassembled object representation 106 and the 3D assembled object representation 108.

The display of the user interface is updated by the at least one computing device to include the 3D representation of the object in the assembled state and a 2D flattened view (block 704). In accordance with the principles discussed herein, the 2D flattened view includes selected panels of the object that are arranged as assembled and also includes identified neighboring panels arranged to abut the selected panels. By way of example, the computing device 102 displays the user interface 302 as depicted at the fourth stage 310, which includes a concurrent display of the neighboring panel view 116 and the 3D assembled object representation 108.

User input is received, via the user interface, to visually modify the object (block 706). In accordance with the principles discussed herein, the user input is applied to either the 2D flattened view or the 3D representation of the object in the assembled state. By way of example, a user input based on detecting the hand 314 of the user dragging the graphic 402 is received via the user interface 302 to apply the graphic 402 to the 3D assembled object representation 108.

The visual modification of the object for the 2D flattened view and the 3D representation of the object in the assembled state are concurrently displayed (block 708). By way of example, the view generation module 114 causes application of the graphic 402 to both the neighboring panel view 116 and the 3D assembled object representation 108 to be displayed concurrently, even though the user input to apply the graphic 402 is received in relation to the 3D assembled object representation 108.

Having described example procedures in accordance with one or more implementations, consider now an example system and device that can be utilized to implement the various techniques described herein.

Example System and Device

Figure 8:
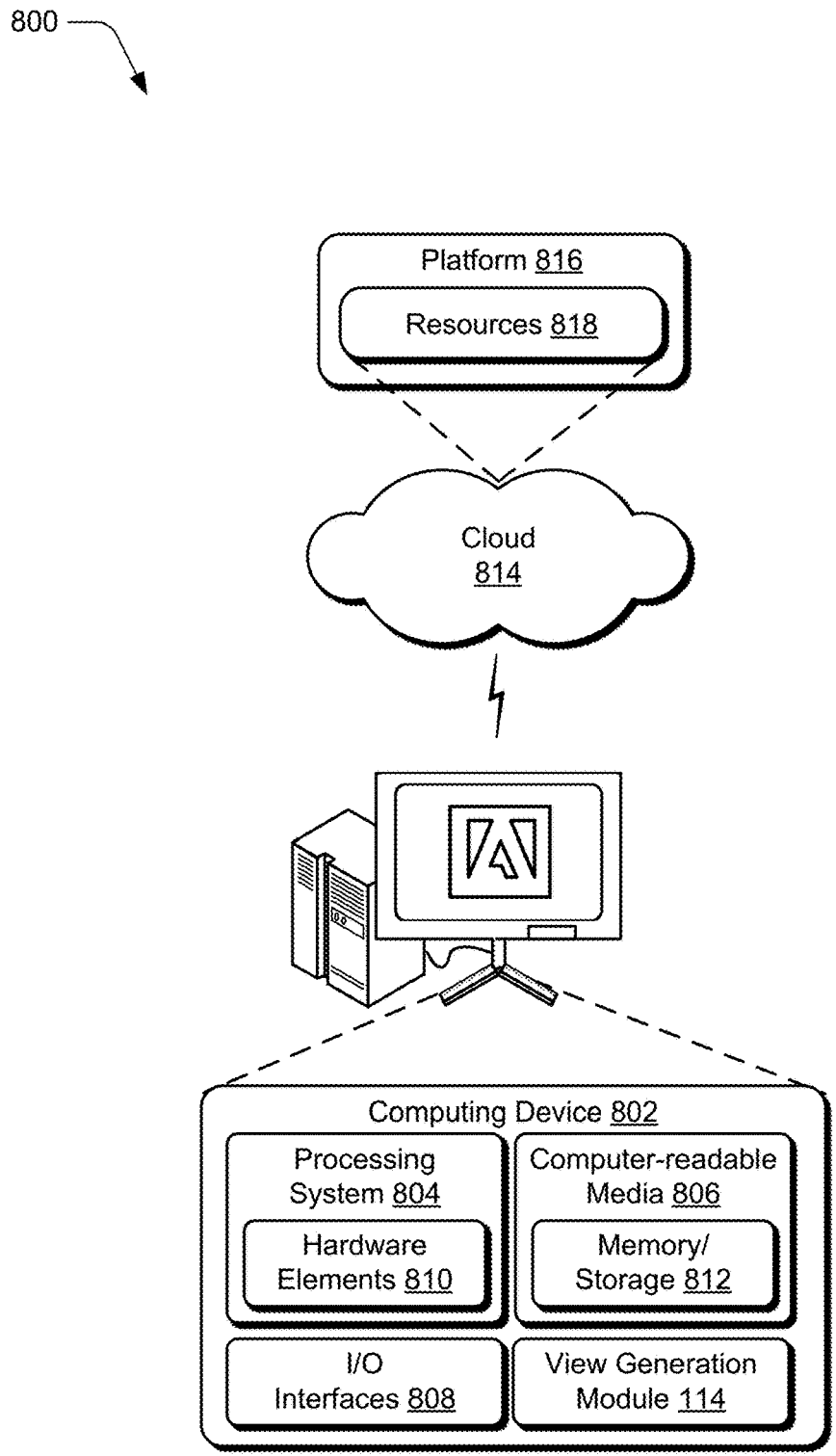
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the view generation module 114. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data.

Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by at least one computing device, a selection of a plurality of panels of a three-dimensional (3D) assembled representation of an object, the plurality of panels that are selected being folded to form a face of the object in the 3D assembled representation;
receiving, by the at least one computing device, an indication to display a two-dimensional (2D) flattened view in which selected panels are displayed coplanar with neighboring panels of the object;
identifying, by the at least one computing device, the neighboring panels of the plurality of panels that are selected, the neighboring panels identified based on the 3D assembled representation or a 2D unassembled representation of the object, the 2D unassembled representation corresponding to a first arrangement of panels that includes all panels of the object arranged as when the object is unassembled;
determining, by the at least one computing device, a second arrangement of panels for the 2D flattened view, wherein:
the second arrangement is limited to the plurality of panels that are selected and the neighboring panels;
the second arrangement has the plurality of panels that are selected being displayed folded in the 2D flattened view in a same way that the plurality of panels are folded to form the face of the object in the 3D assembled representation;
the second arrangement further has the neighboring panels being disposed adjacent to respective selected panels; and
the second arrangement is further determined by transforming at least one of the neighboring panels that corresponds to a different plane from a respective selected panel so that the at least one neighboring panel is coplanar with the respective selected panel for the 2D flattened view; and displaying, by the at least one computing device, the 2D flattened view via a user interface.

2. The method of claim 1, wherein the neighboring panels are identified based on vectors describing normals of the object's panels as positioned in the 3D assembled representation of the object.

3. The method of claim 1, further comprising displaying the 2D flattened view and the 3D assembled representation of the object concurrently on a display device.

4. The method of claim 1, further comprising:
receiving a user input to apply a graphic to a portion of one of the 2D flattened view or the 3D assembled representation of the object;
displaying application of the graphic to the portion; and
concurrently displaying application of the graphic to a corresponding portion of the other of the 2D flattened view or the 3D assembled representation of the object.

5. The method of claim 1, further comprising:
determining a loop of panels around the 3D assembled representation of the object; and
displaying an additional 2D flattened view via the user interface, the additional 2D flattened view being scrollable infinitely across the loop of panels in a horizontal or vertical direction.

6. The method of claim 1, wherein determining the 2D flattened view further comprises:
attaching a neighboring panel identified from the 2D unassembled representation along a crease between the neighboring panel identified from the 2D unassembled representation and the respective selected panel; or
attaching a neighboring panel identified from the 3D assembled representation to an edge of the respective selected panel adjacent to which the neighboring panel identified from the 3D assembled representation is disposed based on assembly of the object.

7. The method of claim 1, wherein the first arrangement of the 2D unassembled representation of the object is a dieline of the object.

8. The method of claim 1, wherein the neighboring panels identified based on the 2D unassembled representation of the object comprise at least one panel sharing a crease with the plurality of panels.

9. The method of claim 1, wherein identifying the neighboring panels includes identifying at least one superior panel that is folded over another panel as neighboring a respective selected panel based on adjacency of the at least one superior panel to the respective selected panel in the 3D assembled representation.

10. The method of claim 1, wherein each of the neighboring panels is disposed adjacent to only a respective selected panel in the 2D flattened view.

11. A system comprising:
one or more processors; and
memory storing computer-readable instructions that are executable by the one or more processors to implement:
a neighbor identification module to identify panels of an object that neighbor a plurality of selected panels based on positions of the neighboring and selected panels in a two-dimensional (2D) representation of the object in an unassembled state or in a three-dimensional (3D) representation of the object in an assembled state, the plurality of selected panels being folded to form a face of the object in the 3D representation, and the 2D representation corresponding to a first arrangement of panels that includes all panels of the object arranged as when the object is unassembled; and
an arrangement module to determine a second arrangement of panels for a 2D flattened view, wherein:
the second arrangement has the plurality of selected panels being displayed folded in the 2D flattened view in a same way that the plurality of selected panels are folded to form the face of the object in the 3D, representation;
the second arrangement further has the neighboring panels being disposed adjacent to respective selected panels; and
the second arrangement is further determined by transforming at least one of the neighboring panels that corresponds to a different plane from the face in the 3D representation so that the at least one neighboring panel is coplanar with the face for the 2D flattened view.

12. The system of claim 11, wherein the computer-readable instructions are further executable by the one or more processors to implement a display module to display the 2D flattened view on a display device.

13. The system of claim 11, wherein the computer-readable instructions are further executable by the one or more processors to implement a display module to display the 2D flattened view and the 3D representation of the object concurrently on a display device.

14. The system of claim 11, wherein the neighbor identification module is further implemented to identify neighboring panels based on vectors describing normals of the object's panels as positioned in the 3D representation of the object.

15. The system of claim 11, wherein the computer-readable instructions are further executable by the one or more processors to implement an application to provide functionality for applying digital graphics to at least one of the 2D representation of the object in the unassembled state, the 3D representation of the object in the assembled state, or the 2D flattened view.

16. Non-transitory computer-readable storage media storing instructions that are executable by one or more processors to perform operations including:
receiving a selection of a plurality of panels of a three-dimensional (3D) assembled representation of an object, the plurality of panels that are selected being folded to form a face of the object in the 3D assembled representation;
receiving an indication to display a two-dimensional (2D) flattened view in which selected panels are displayed coplanar with neighboring panels of the object;
identifying the neighboring panels of the plurality of panels that are selected, the neighboring panels identified based on the 3D assembled representation or a 2D unassembled representation of the object, the 2D unassembled representation corresponding to a first arrangement of panels that includes all panels of the object arranged as when the object is unassembled; and
determining a second arrangement of panels for the 2D flattened view, wherein:
the second arrangement has the plurality of panels that are selected being displayed folded in the 2D flattened view in a same way that the plurality of panels are folded to form the face of the object in the 3D assembled representation;
the second arrangement further has the neighboring panels being disposed adjacent to respective selected panels; and
the second arrangement is further determined by transforming at least one of the neighboring panels that corresponds to a different plane from a respective selected panel so that the at least one neighboring panel is coplanar with the respective selected panel for the 2D flattened view.

17. The non-transitory computer-readable storage media of claim 16, wherein the operations further include displaying the 2D flattened view via a user interface.

18. The non-transitory computer-readable storage media of claim 16, wherein the operations further include displaying a user interface that includes concurrently a display of the 3D assembled representation and a display of the 2D flattened view.

19. The non-transitory computer-readable storage media of claim 18, wherein the operations further include:
   receiving, via the user interface, user input to apply a visual modification to the object, the user input to apply the visual modification being received in relation to only one of the display of the 2D flattened view or the display of the 3D assembled representation; and
   displaying application of the visual modification of the object concurrently on both the display of the 2D flattened view and the display of the 3D assembled representation in real-time as the user input to apply the visual modification to the object is received.

20. The non-transitory computer-readable storage media of claim 19, wherein the operations further include generating a file usable to print the object in an unassembled state with the visual modification.

\* \* \* \* \*